United States Patent
Thubert et al.

(10) Patent No.: US 7,203,175 B2
(45) Date of Patent: Apr. 10, 2007

(54) ARRANGEMENT FOR ROUTER ATTACHMENTS BETWEEN ROAMING MOBILE ROUTERS IN A MOBILE NETWORK

(75) Inventors: Pascal Thubert, La Colle sur Loup (FR); Patrick Wetterwald, Cagnes sur Mer (FR); Marco Molteni, Antibes (FR); David Charlton Forster, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 1071 days.

(21) Appl. No.: 10/218,515

(22) Filed: Aug. 15, 2002

(65) Prior Publication Data

US 2004/0032852 A1 Feb. 19, 2004

(51) Int. Cl.
*H04B 7/00* (2006.01)
*H04L 12/28* (2006.01)

(52) U.S. Cl. .................. 370/254; 370/401; 370/408; 370/310

(58) Field of Classification Search ............ 370/310, 370/315, 329, 338, 400, 401, 408, 351, 389, 370/254, 256
See application file for complete search history.

(56) References Cited

U.S. PATENT DOCUMENTS

| | | | |
|---|---|---|---|
| 2001/0046223 A1 | 11/2001 | Malki et al. | |
| 2002/0039367 A1 * | 4/2002 | Seppala et al. | 370/401 |
| 2002/0061009 A1 * | 5/2002 | Sorensen | 370/351 |

FOREIGN PATENT DOCUMENTS

| | | |
|---|---|---|
| EP | 1 381 200 | 1/2004 |
| WO | WO 01/06717 | 1/2001 |
| WO | WO 03/033109 | 4/2003 |

OTHER PUBLICATIONS

Soliman et al., Hierarchical MIPv6 mobility management (HMIPv6), IETF Mobile IP Working Group, Internet-Draft, draft-ietf-mobile-hmipv6-06.txt, Jul. 2002.

(Continued)

*Primary Examiner*—Chau Nguyen
*Assistant Examiner*—Kerri M. Rose
(74) *Attorney, Agent, or Firm*—Leon R. Turkevich

(57) ABSTRACT

A mobile router is configured for attaching to a selected router in a mobile network based on identifying a network topology model of the mobile network from received router advertisement messages that include tree information option fields specifying attributes of the network topology model. The mobile router selects which router advertisement originator to attach to based on correlating the attributes of the router advertisement originators relative to identified priorities, and orders the router advertisement originators within a default router list based on the identified priorities. The mobile router attaches to one of the routers in the ordered default router list having a higher priority, and upon attaching to the router advertisement originator as its attachment router, the mobile router transmits its own corresponding router advertisement message including a corresponding tree option field that specifies the attributes of the mobile router within the network topology model, enabling other routers to selectively connect and/or reconnect within the mobile network based on their respective identified preferences.

33 Claims, 10 Drawing Sheets

OTHER PUBLICATIONS

Thubert et al., "IPv6 Reverse Routing Header and its application to Mobile Networks", IETF Network Working Group, Internet-Draft, draft-thubert-nemo-reverse-routing-header-00, Jun. 19, 2002.

Deering et al., "ICMP Router Discovery Messages", Request for Comments: 1256, IETF Network Working Group, Sep. 1991.

Ernst et al., "Network Mobility Support Terminology", Internet Engineering Task Force (IETF), Internet Draft, draft-ernst-monet-terminology-00.txt, Feb. 2002.

Perkins, "IP Mobility Support for IPv4", IETF Networking Group, Request for Comments 3220, Jan. 2002.

Narten et al., "Neighbor Discovery for IP Version 6 (IPv6)", IETF Network Working Group, Request for Comments 2461, Dec. 1998.

Thubert et al., "IPv6 Reverse Routing Header and its application to Mobile Networks", IETF Network Working Group, Internet Draft, draft-thubert-nemo-reverse-routing-header-00, Jun. 19, 2002.

Johnson et al., "Mobility Support in IPv6", IETF Mobile IP Working Group, Internet Draft, draft-ietf-mobileip-ipv6-18.txt, Jun. 1, 2002.

* cited by examiner

ARRANGEMENT FOR ROUTER ATTACHMENTS BETWEEN ROAMING MOBILE ROUTERS IN A MOBILE NETWORK

BACKGROUND OF THE INVENTION

1. Field of the Invention

The present invention relates to establishment and management of a mobile network by mobile routers, where the mobile network is capable of changing its point of attachment to a wide area network (e.g., the Internet) and thus its reachability in its associated topology.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, available on the World Wide Web at the Network Mobility Home Page at the address http://www.nal.motlabs.com/monet/. One exemplary Internet Draft by Thierry Ernst, entitled "Network Mobility Support Terminology", February 2002, is available on the World Wide Web at the address: http://www.nal.motlabs.com/monet/drafts/draft-ernst-monet-terminology-01.txt, the disclosure of which is incorporated in its entirety herein by reference.

For example, Ernst describes an exemplary mobile network that can be deployed within an airplane, where passengers establish an IP connection of their respective IP host devices (e.g., laptop, digital telephone, personal digital assistant, etc.) to a mobile router within the airplane for on-board Internet access; during the flight, the mobile router within the aircraft may change its point of attachment to the Internet via distinct Internet Service Providers (ISPs), for example by changing connections via respective radio links or geostationary satellite links for transoceanic flights. Note that a passenger also may have his or her own network (i.e., a personal area network) within the mobile network.

According to the NEMO group, a mobile network may be composed by one or more IPsubnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router of a wide area network, such as the Internet, providing connectivity for the mobile network to the wide area network. The mobile router thus serves as a gateway to route packets between the mobile network and the Internet.

A particular concern involves the nesting of multiple mobile networks within each other. FIG. 1 illustrates a mobile network 10 having multiple subnetworks 12a and 12b. In particular, the mobile network 10 includes a mobile router 14a that establishes a link with an attachment router 16a to enable a local node 18 (e.g., 18a, 18b) to communicate with a correspondent node (CN) 20 via the Internet 22. As illustrated in FIG. 1, the mobile router 14a provides a link for the local fixed node 18a and the local mobile node 18b within the subnetwork 12a, and the visiting mobile router 14b provides IP connectivity for the local fixed node 18c within the subnetwork 12b. In addition, since the visiting mobile router 14b relies on the mobile router 14a to establish the link 24 with the attachment router 16a, the mobile router 14a is deemed the top level mobile router (TLMR) that connects the mobile network 10 to the Internet 22.

A problem arises if additional routers attempt to connect to the mobile network 10, in that arbitrary connections may result in inefficient communications. For example, assume mobile routers 14c and 14d are attempting to connect to the mobile network 10: the resulting structure of the mobile routers 14c and 14d connecting to the mobile router 14b may result in an undesirable network configuration that creates substantial delays for nodes 18 connected to the mobile router 14d.

SUMMARY OF THE INVENTION

There is a need for an arrangement that enables a mobile router to establish a communication link within a mobile network in a manner that provides optimum communication performance for the mobile router.

There also is a need for an arrangement that enables routers within a mobile network to select an optimum configuration based on identified preferences.

These and other needs are attained by the present invention, where a mobile router is configured for attaching to a selected router in a mobile network based on identifying a network topology model of the mobile network from received router advertisement messages that include tree information option fields specifying attributes of the network topology model. The mobile router selects which router advertisement originator to attach to based on correlating the attributes of the router advertisement originators relative to identified priorities, and orders the router advertisement originators within a default router list based on the identified priorities. The mobile router attaches to one of the routers in the ordered default router list having a higher priority, and upon attaching to the router as its attachment router, the mobile router transmits its own corresponding router advertisement message including a corresponding tree option field that specifies the attributes of the mobile router within the network topology model, enabling other routers to selectively connect and/or reconnect within the mobile network based on their respective identified preferences.

One aspect of the present invention provides a method in a mobile router configured for establishing communications within a mobile network having at least two routers. The method includes detecting a router advertisement message that includes a source address identifying the corresponding router having sent the router advertisement message, and a tree information option field having attributes specifying a network topology model of the corresponding router. The method also includes determining a priority of the network topology model relative to identified priorities, and selectively attaching to the router having sent the router advertisement message based on the determined priority of the corresponding network topology model.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
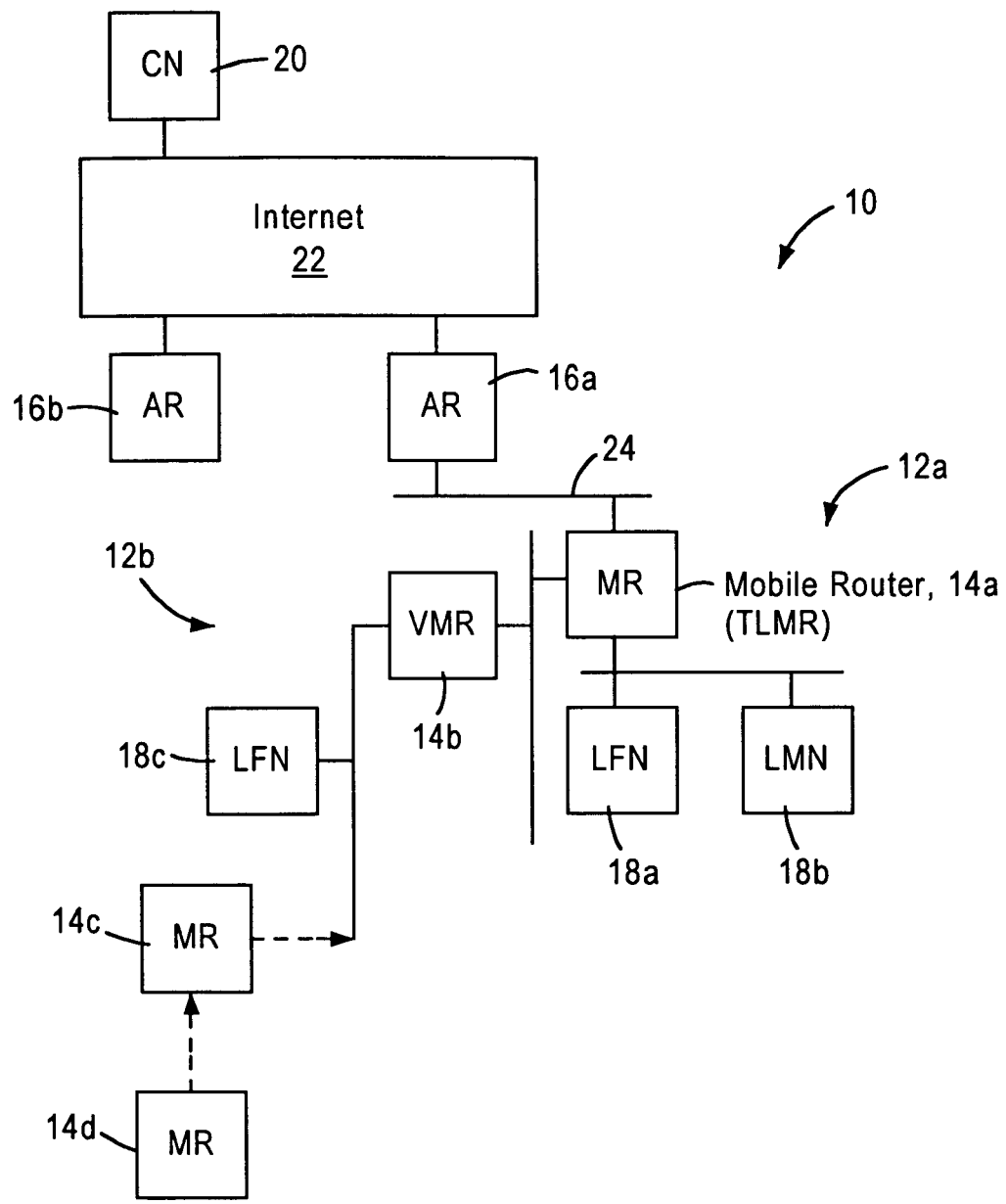
FIG. 1 is a diagram illustrating a (PRIOR ART) mobile network having multiple mobile routers connected to a top level mobile router (TLMR).

The disclosed embodiment is directed to an arrangement for a mobile router to attach to a router in a mobile network in order to establish an optimized communication with its home agent via a wide area network such as the Internet. Various proposals have been presented to the Internet Engineering Task Force (IFTF) for a mobile router to attach to a mobile network according to IPv6 protocol, including Thubert et al., "IPv6 Reverse Routing Header and its Application to Mobile Networks", Jun. 19, 2002, the disclosure of which is available on the World Wide Web at http://www.i-etf.org/internet-drafts/draft-thubert-nemo-reverse-routing-header-00.txt and is incorporated in its entirety herein by reference.

The disclosed embodiment expands on the disclosure of the above-incorporated Thubert et al. by providing a methodology for the mobile router to attach to an attachment router for connectivity in the mobile network. As described in detail below, the mobile router "attaches" to an attachment router by: (1) selecting a default router as an attachment router; (2) establishing an updated care-of address; and (3) sending a bind update message to the home agent.

In particular, the mobile router selects an attachment router from its default router list, and uses it as its default router; router information in the internal default router list is obtained using known router discovery techniques, and by detecting unsolicited router advertisement messages. The router advertisement messages may include a tree information option, described in the above-incorporated Thubert et al., enabling the mobile router to store within the default router list the attributes of each detected router, as well as the attributes of the tree to which the detected router is attached. The mobile router selects its attachment router from the internal default router list based on configurable network interface and group options, and based on whether a preference-based attachment or connectivity-based attachment is preferred.

Once the mobile router selects a default router to be used as an attachment router, the mobile router establishes an updated care-of-address based on the IP address prefix advertised by the selected default router. The updated care-of-address has a foreign subnet prefix (i.e., an IP subnet prefix other than the mobile router's home subnet prefix) matching the subnet prefix used by the selected default router. Also note that the mobile router may have multiple stored care-of-addresses (with respective subnet prefixes) that are not registered with the mobile router's home agent.

The mobile router completes the attachment by sending a bind update message to its home agent that specifies the updated care-of address, enabling the home agent to send datagrams to the mobile router via a tunnel terminating at the updated care-of address.

The following text and accompanying drawings will provide additional details for the improved arrangement for a mobile node to attach to a mobile network.

Figure 2:
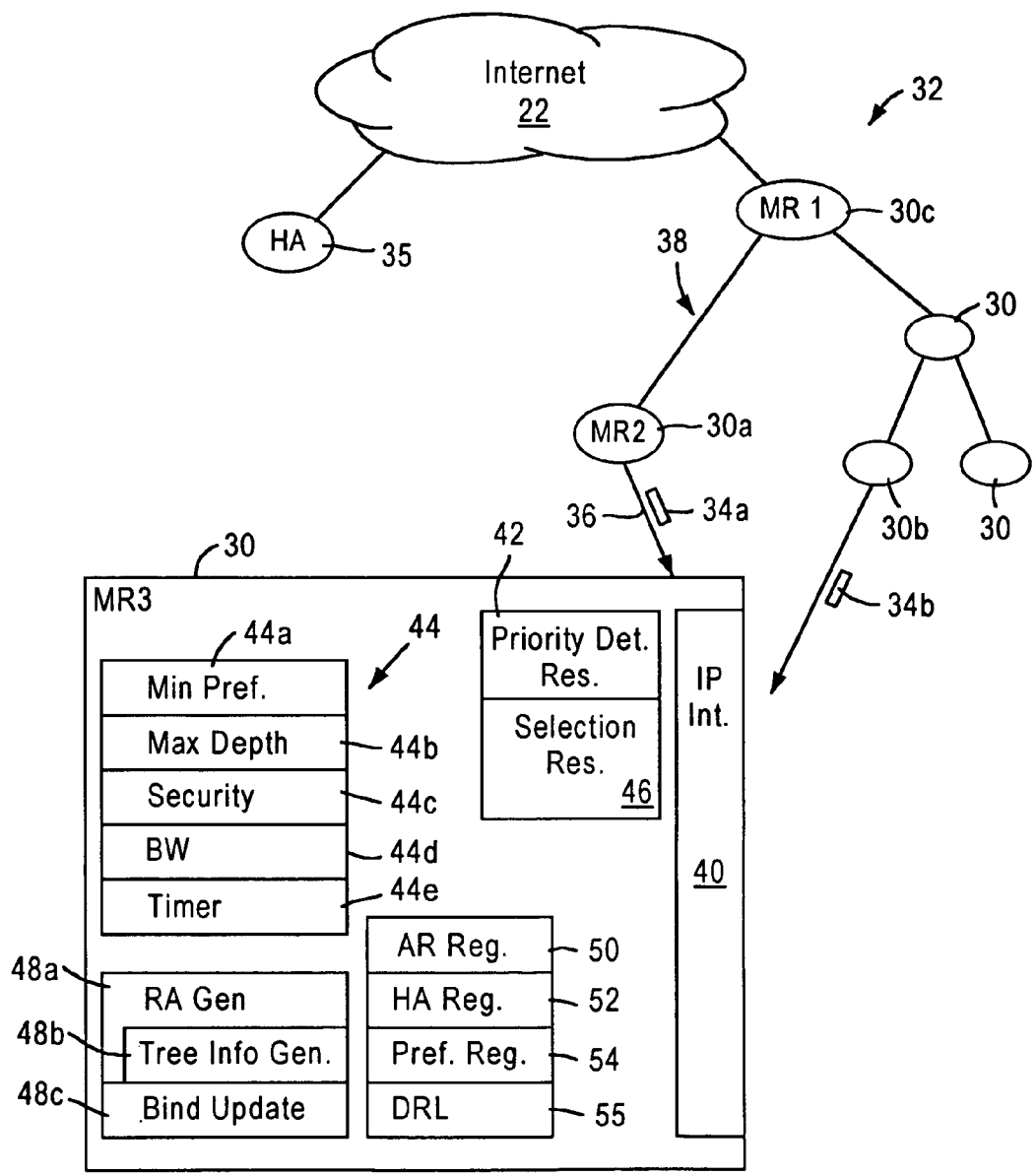
FIG. 2 is a diagram illustrating a mobile router configured for establishing a connection within a mobile network based on router advertisement messages having tree information option fields specifying mobile network network topology models, according to an embodiment of the present invention.

FIG. 2 is a diagram illustrating a mobile router 30 (e.g., "MR3") configured for attaching to a mobile network 32 via a link 36 (e.g., an 802.11 wireless link) based on router advertisement messages (e.g., 34a, 34b) having tree information option fields specifying mobile network network topology models, according to an embodiment of the present invention. The disclosed router 30 enables mobile IP-based nodes to automatically establish a dynamic mobile network that provides optimized network topology models 38, according to selected routing constraints, based on IPv6 protocol. In particular, each mobile router (e.g., 30, 30a, 30b, etc.) outputs a router advertisement (RA) message 34 that enables other routers to independently determine whether to associate with (i.e., attach to) the corresponding router, also referred to as the router advertisement (RA) originator, based on the corresponding RA message. Hence, the mobile router 30 ("MR3"), upon receiving an RA message 34a (or 34b) from a router 30a (or 30b), selects whether to attach to the corresponding router advertisement originator 30a (or 30b) having output the RA message based on attributes supplied by the RA message, described below. The mobile router 30 associates with the router advertisement originator 30a (or 30b) by storing the information in the RA message in its default router list, and selecting the source of the RA message as its attachment router; the mobile router then updates its care-of address, and sends a bind update message to its home agent to complete the attachment to the attachment router. The independent selection by each router of whether to attach to another router enables the routers to dynamically establish a tree-based network topology model, where each router may continually determine whether an alternate attachment point within the tree is preferred.

The router 30 includes an IP network interface 40, for example an IPv6 or mobile IPv4 network interface utilizing, for example, a wireless 802.11 link. The IP network interface 40 is configured for detecting the router advertisement messages 34 from the routers (e.g., 30a, 30b, etc.) that are reachable by the router 30. As described below, a selection resource 46 determines whether to store the information from the router advertisement messages 34 into a default router list (DRL) 55. The router 30 also includes a priority determination resource 42 configured for parsing each entry of the default router list 55 based the information obtained from the received router advertisement messages 34 to determine the priority of the corresponding network topology model 38 relative to identified priorities, including locally stored priorities that are stored in local registers 44, and ordering the entries in the default router list based on the respective attributes and the identified priorities. As described below, the local registers 44 may include a minimum preference register 44a configured for storing a minimum preference value, a maximum depth register 44b configured for storing a prescribed maximum depth value, a security register 44c configured for storing any prescribed security attributes that may be required for connection according to a network administrator, and a minimum bandwidth register 44d configured for storing a minimum bandwidth requirement for the attachment router 30.

The router 30 also includes a selection resource 46 configured for selectively attaching to one of the routers (e.g., 30a) based on the determined priority of the corresponding router (e.g., 30a) and its corresponding network topology model (i.e., its position within the mobile network 32) from the corresponding RA message (e.g., 34a). As described below, the selection resource 46 can be implemented as executable code configured for initiating selection operations in response to reception of a router advertisement message, or a timeout of a tree management related timer, a tree hop timer, or a router expiration timer.

The router 30 also includes resources 48 for generating RA messages. For example, the router 30 includes a router advertisement generation resource 48a configured for outputting its own router advertisement messages, according to IP protocol. In addition, the router advertisement generation resource 48a includes a tree information option generation resource 48b configured for generating a tree information option field, described with respect to FIG. 3, based on the mobile router 30 having a connection with a tree (i.e., a network topology model) 38 within the mobile network 32. The router 30 also includes a bind update resource 48c configured for generating a bind update message to a home agent (HA) 35 for the mobile router 30, in accordance with the above-incorporated Thubert et al. document (available at http://www.ietf.org/internet-drafts/draft-thubert-nemo-reverse-routing-header-00.txt ) and the Request for Comments (RFC) 2461, Neighbor Discovery for IP version 6 (IPv6), published by the IETF.

The router 30 also includes an attachment router register 50 configured for specifying the IP address for a current attachment router selected by the mobile router 30 from the default router list 55 to access its home agent specified by the corresponding IP address in the home agent register 52. Alternatively the attachment router register 50 may specify a pointer to an entry in the default router list 55 for the selected router.

Figure 3:
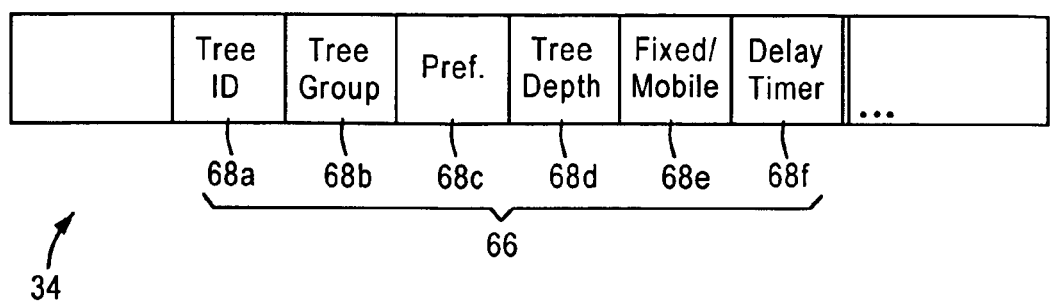
FIG. 3 is a diagram illustrating in detail a router advertisement message having tree information option fields.

FIG. 3 is a diagram illustrating in detail a router advertisement message 34 generated by the router advertisement message generator 48a, according to an embodiment of the present invention. The RA message 34 includes Router Advertisement fields as described in RFC 2461. According to the disclosed embodiment, a tree information option field 66 is added to the RA message 34 that includes attributes 68, generated by the tree information generator resource 48b, that specify the network topology model 38 utilized by the router advertisement originator 30, identified by its corresponding IP source address (SA) in the IPv6 header.

For example, the tree information option field 66 includes a tree identifier 68a, a tree group identifier 68b, a preference field 68c, a tree depth field 68d, a fixed/mobile field 68e, and a delay timer field 68f. The tree identifier field 68a is configured for storing an IP address of the top level mobile router, for example an IEEE based 64-bit extended unique identifier (EUI-64) based link local address. The tree group field 68b is configured for storing a tree group identifier, for example an IPv6 address of a mobile router connected to a TLMR, enabling the priority determination resource 42 and the selection resource 46 to distinguish between multiple tree groups (i.e., branches) within the same mobile network 32. The preference field 68c is configured for storing a preference value for the mobile router 30 as stored in the corresponding preference register 54, enabling a mobile router receiving the RA message 34 to decide whether to associate with the source of the RA message 34. The tree depth field 68d is configured for storing the depth of the mobile router 30 within the tree 38, as specified by the tree information generation resource 48b, enabling other routers receiving the RA message 34 to determine the relative position of the router advertisement originator within the tree 38. The fixed/mobile field 68e is configured for specifying whether the corresponding tree 38 is a grounded tree or a floating tree. In particular, a tree 38 is deemed to be fixed if the top level mobile router is connected to a fixed router or a home agent. The delay timer field 68f is configured for storing a prescribed delay interval utilized by other routers to delay subsequent topology changes, thereby delaying propagation of subsequent RA messages in response to the RA message 34.

The tree information option (TIO) 66 also may include a path checksum field (not shown in FIG. 3), enabling a mobile router to determine whether the path through the tree above it has changed or not; in other words, a path checksum change indicates real path change. When propagating a TIO, an intermediate mobile router builds a byte string using the checksum it receives in a TIO and the 16 bytes of its CareOf address; the mobile router then overwrites the checksum in the TIO with the result. This operation is performed at the same time as the tree depth incrementing. The TLMR uses a checksum of zeroes for its computation.

Figure 4:
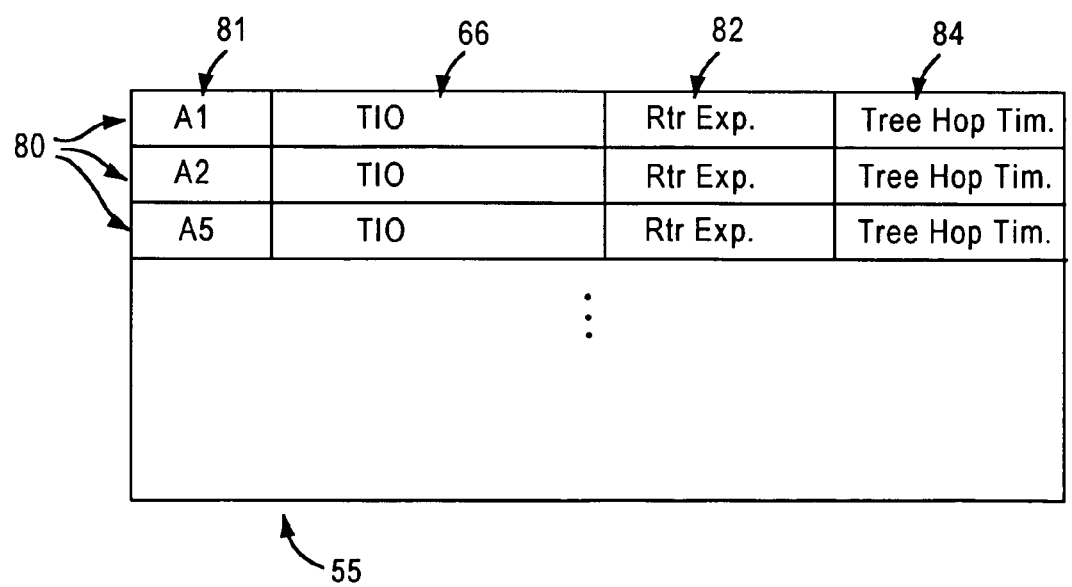
FIG. 4 is a diagram illustrating in detail a default router list configured for storing default router list entries including tree information option fields from received router advertisement messages.

FIG. 4 is a diagram illustrating in detail the default router list 55 of FIG. 3. In particular, the known trees 38 are stored in an ordered list, per order of preference, by extending IPv6 default router lists to include tree information. In particular, each entry 80 of the default router list 55 includes a router address field 81, the TI option fields 66 as received from the router advertisement message 34, a router expiration timer field 82 that specifies information, including timer ID, to determine the expiration of the entry, and a tree hop timer field 84 that specifies information, including a corresponding timer ID, to delay any response to a received RA message in order to provide tree stability, described below.

Figure 7A:
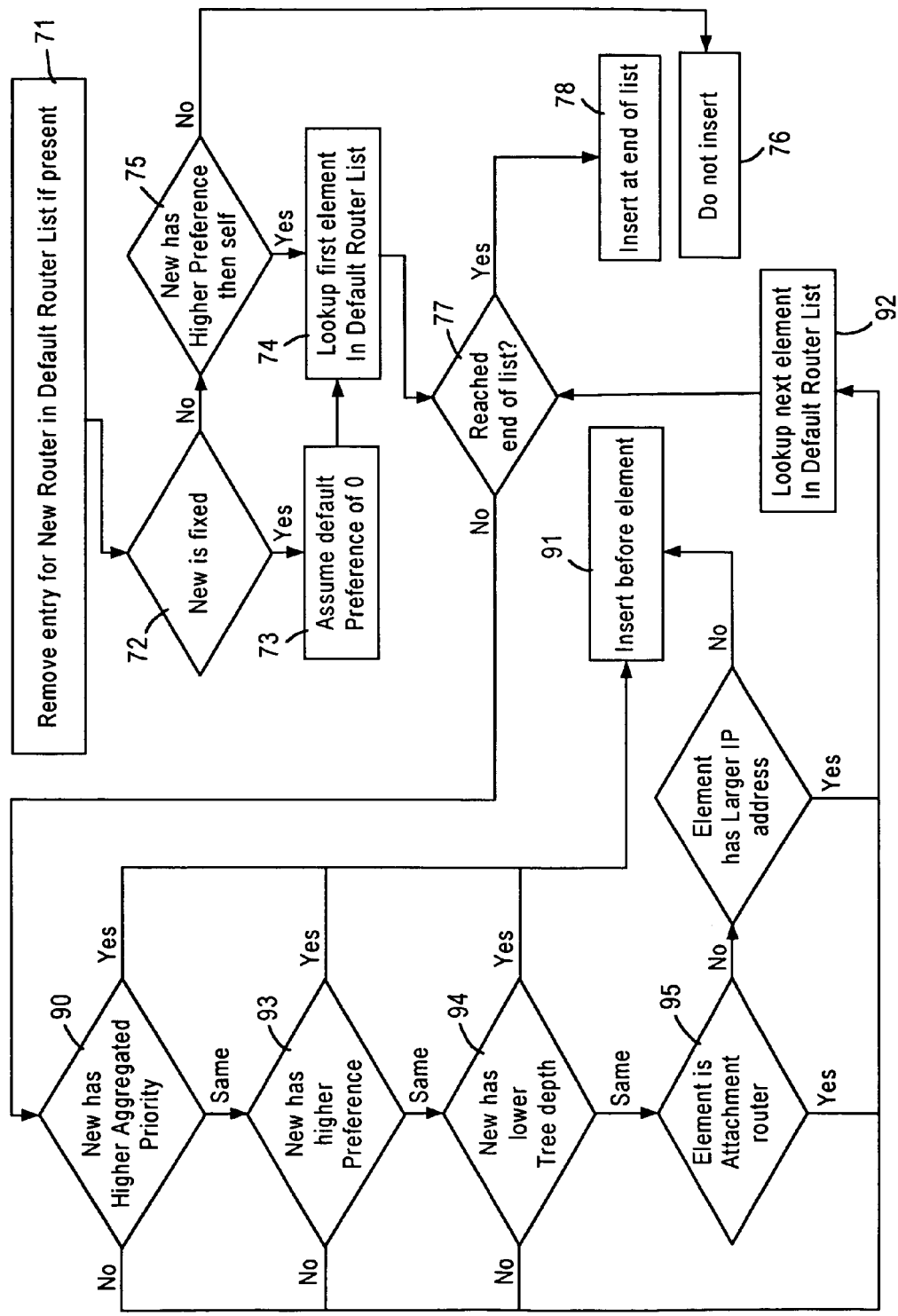
FIGS. 7A, 7B, 7C, 7D and 7E are diagrams summarizing the method of configuring a mobile router for attaching to a mobile network based on selecting a router based on associated tree information option fields, according to an embodiment of the present invention.

The timer resource 44e of FIG. 3 is configured for calculating timer values from the timer information stored in the fields 82, 84, to determine if the corresponding timer has expired, requiring priority determination or selection operations as described below with respect to FIGS. 7B, 7C, and 7D. As apparent from the foregoing, any of the resources 42, 46, 48a, 48b, 48c may be implemented as software-based executable resources, or hardware (e.g., firmware, state machine, etc.).

Hence, each router (e.g., 30, 30a, 30b, etc.) independently determines whether to associate with another router advertisement originator having output an RA message (e.g., 34a, 34b) based on the tree information segment 66 within the RA message 34: the tree information segment 66 specifies attributes 68 about the tree to which the router advertisement originator is associated, including tree identifier, tree depth, and tree preference, and tree mobility (i.e., whether the tree is grounded or floating). Once stored as entries in the default router list 55, the priority determination resource 42 can maintain the known trees in an ordered list, per order of preference: each entry 80 is maintained until the corresponding router expiration timer field 82 expires, described below with respect to FIG. 7C.

Hence, the tree information segment 66 of the RA message enables mobile routers to advertise the network topology model 38 (i.e., tree) they belong to, and to select and move to the best location within the available trees. Note that fixed routers and a mobile router that has a connecting link to its corresponding home subnet (i.e., the link on which the mobile node's home subnet prefix is defined) do not participate in the tree selection and do not output tree information segments 66. Hence, a mobile router 30 can identify a fixed router based on the determined absence of the tree information segment 66 in a received RA message.

As described in further detail below, the root and nodes of the tree are mobile routers, and the leaves are mobile or fixed hosts. The root of the tree is designated the Top Level Mobile Router (TLMR), and the mobile hosts may be Local Mobile Nodes or Visiting Mobile Node, and the fixed host is also referred to as a Local Fixed Node.

Each mobile router that is not attached to (i.e., associated with) a tree is the Top Level Mobile Router of its own tree. Hence, a stand-alone mobile router is the TLMR of a floating tree. A mobile router that is attached to a fixed router, or that is at home, is the TLMR of a grounded tree. Hence, a grounded tree has a TLMR attached to a fixed router, and a floating tree has a TLMR that is not attached.

If a mobile router performs a change in tree status (e.g., joins a tree, moves within its tree, or when it receives a modified tree information segment from its current attachment router), the mobile router sends an unsolicited RA message on all of its mobile networks that includes the tree information (TI) segment 66 reflecting the change (e.g., sending the TI segment 66 received from the current attachment router, with the tree depth 68d incremented by one). Hence, each mobile router is aware of any modification in the tree it is attached to. Note, however, that in order to avoid an excessive number of RA messages 34 from being propagated throughout a tree, the mobile router 30 will delay its reaction to a new TI option 66 by a delay that is proportional to its tree depth, and the delay time specified within the delay timer field 68f, plus a random time interval that is less than the tree delay time specified by the delay timer field 68f; hence, the higher parts of the tree may move first to a new connection and "drag" their subtree along as a connected subtree. Consequently, mobile routers within the subtree will move after the delay interval to optimize connections based on the new tree configurations.

Figure 5:
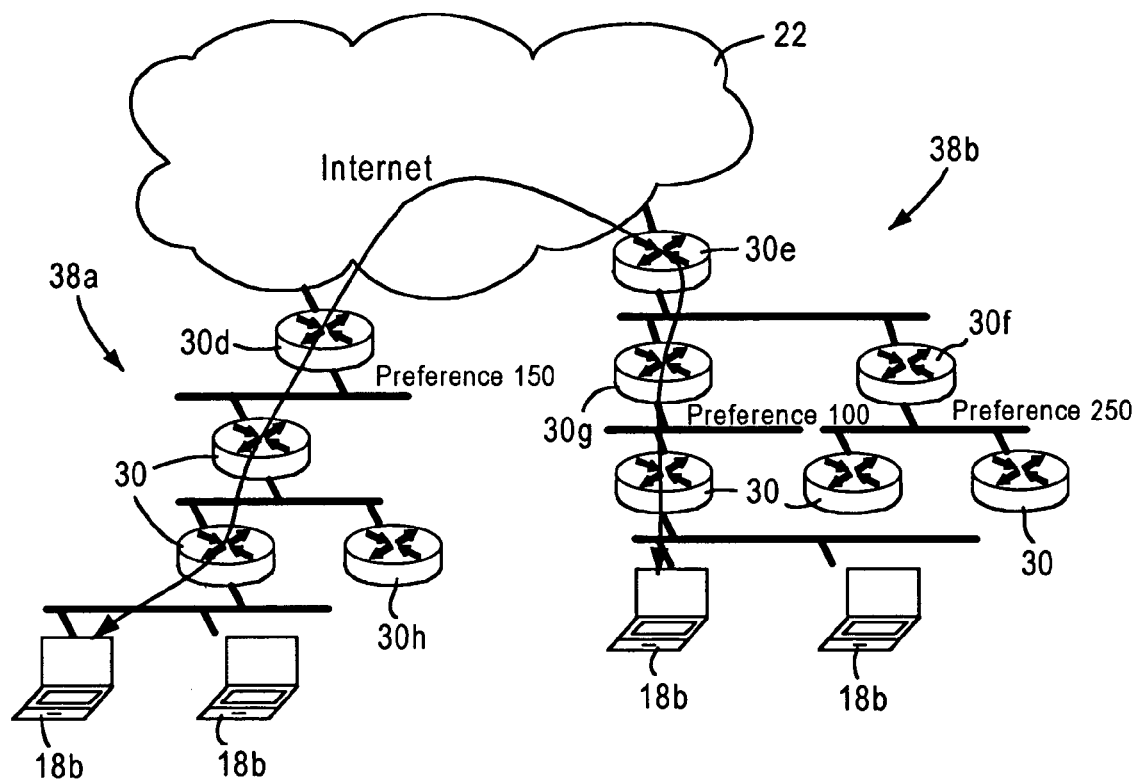
FIG. 5 is a diagram illustrating a connectivity-based tree construction by mobile routers, according to an embodiment of the present invention.

As described above, each mobile node 30 is configured for independently selecting a connection between different mobile routers; hence, mobile routers can be individually configured by a network engineer to prefer a connectivity based tree construction, or a tree-favored construction. FIG. 5 is a diagram illustrating a connectivity-based tree construction 38a, 38b by mobile routers, where each mobile router favors a router having a connection to the Internet 22. In particular, assume the mobile router 30d has a prescribed preference value of 150, the mobile router 30f has a prescribed preference value of 250, the mobile router 30g has a prescribed preference value of 100, and the remaining mobile routers 30 have a prescribed preference value of zero. According to the disclosed embodiment, preference values maybe sent by a network administrator to have a range of between 0 and 255. As illustrated in FIG. 5, the mobile router 30g prefers to connect to the mobile router 30e because the mobile router 30e has an Internet connection (i.e., has a fixed router as its attachment router). Hence, since the routers 30d and 30e have fixed routers within the Internet 22 as their attachment routers, the routers 30d and 30e automatically are deemed the top-level mobile routers (TLMR) based on the fixed routers associated with the respective network topology models 38a and 38b. Hence, the router 30f ends up as a tree node, despite the higher preference value of 250, because it does not have a direct Internet connection. Also note that connectivity-based preference may result in multiple trees (i.e. multiple TLMRs attached to the same attachment router).

Figure 6A:
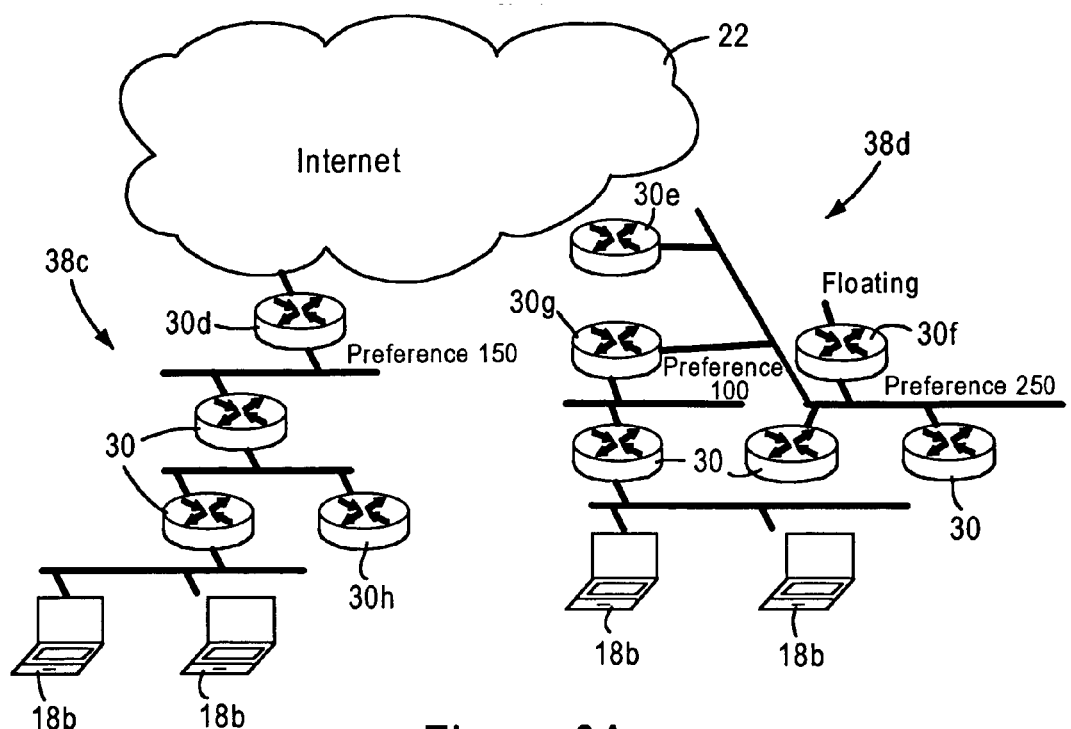
FIGS. 6A and 6B are diagrams illustrating a preference-based construction by mobile routers.
Figure 6B:
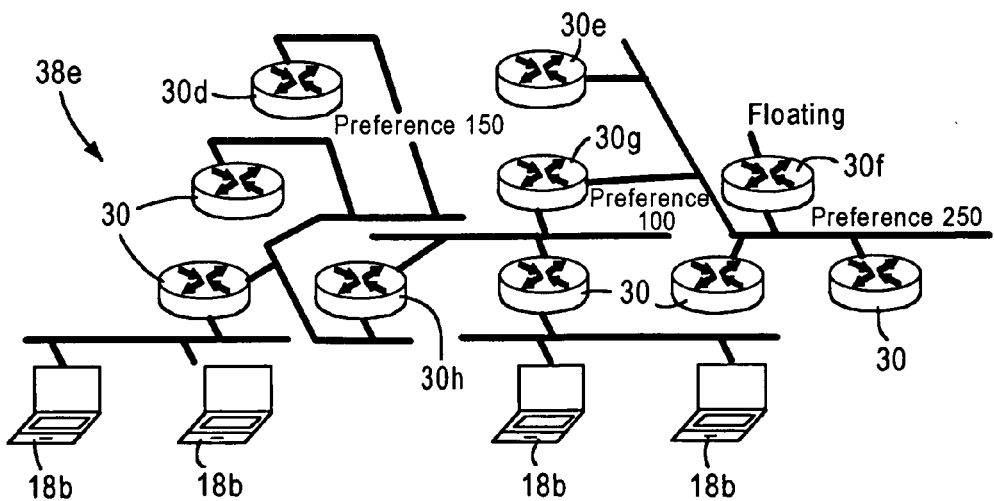

FIGS. 6A and 6B are diagrams illustrating a preference-based construction by mobile routers. Preference-based network topology models 38c and 38d may be preferred where the given structure must be enforced and the Internet connection is highly controlled, for example in the case of public services or a mobile network deployed on a commercial transportation system, for example a train system, or a fleet of marine vessels. As illustrated in FIG. 6A, the router 30f, having a preference value of 250, takes over ownership of the network topology model 38d and becomes the top-level mobile router. Although establishment of the router 30g has the top level mobile router may cause the tree 38d to lose its connectivity with the Internet 22 and become a floating tree, a more consistent internal connectivity may be established within the tree 38d: in particular, note that four routers in the tree 38d select the router 30f as their attachment router, whereas only two routers select the router 30e in FIG. 5 as their attachment router.

FIG. 6B illustrates that the router 30h establishes a connection with the router 30g based on detecting the corresponding RA message 34 having the tree information option 66; in this case, the connection by the router 30h to the router 30g enables formation of a larger, unique tree 38e that may eliminate the necessity of an Internet connection 22.

The mobile router 30 performs attachment router selection based on identifying router entries 80 that belong to an identified group interfaces having the highest interface and group aggregated priority. In particular, each mobile router 30 can be configured with network interface preferences (e.g., radio wireless prefereable over infrared wireless) where identified access interface types can either be identified as being preferred, or to be avoided. Similarly, the tree group 68b may specify an IPv6 address for a tree group that is has a highest preference, a reduced preference, or that is to be avoided. Hence, the mobile router may prefer (or avoid) selection of certain entries based on the highest interface and group aggregated priority.

If a mobile router is configured to favor the preference-based construction of FIGS. 6A and 6B, the mobile router determines, from the entries 80 having the highest interface and group aggregated priority, whether any other entry within the highest interface and group aggregated priority has a preference value 68c higher than the corresponding preference value for the default router specified as the current attachment router in the AR register 50 (note the AR register 50 merely may include a pointer to the router entry 80 storing the router information for the currently-scheduled default router). Note that if none of the entries 80 having the highest interface and group aggregated priority are reachable, the router may become its own root.

If a mobile router 30 favors a connectivity-based tree as illustrated in FIG. 5, the mobile router 30 determines, from the entries 80 having the highest interface and group aggregated priority, whether any of the routers are a fixed router; if no fixed router is available, the mobile router searches for a grounded tree. If the mobile router 30 detects multiple grounded trees within the group of highest interface and group aggregated priority, the mobile router searches for the multiple grounded tree having the minimum tree depth; if the tree depth values are equal, the mobile router determines if any of the grounded trees have home agent capability. If none of these attributes are found, the mobile router maintains the current attachment router as opposed to selecting a new attachment router.

FIGS. 7A, 7B, 7C, 7D and 7E are diagrams summarizing the method of configuring a mobile router and attaching to a mobile router within a mobile network, according to an embodiment of the present invention. The steps described in FIGS. 7A, 7B, 7C, 7D, and 7E can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

As described below, each of the figures (FIGS. 7A–7E) illustrate operations performed by the executable resources within the mobile router 30 in response to a corresponding set of events and based on a corresponding configuration. As described in detail below, the priority determination resource maintains the ordering of the default router list 55, and the selection resource 46 selects the attachment router based on a prescribed access list rules. For example, FIG. 7A illustrates execution of a preference-based attachment router selection by the router 30; FIG. 7B illustrates execution of a connection-based attachment router selection by the router 30; FIG. 7C illustrates execution of attachment router selection by the router 30 in response to detecting a router advertisement message; FIG. 7D illustrates execution of attachment router selection by the router 30 in response to detecting an expiration of a router expiration timer 82 for an entry in the default router list; and FIG. 7E illustrates execution of attachment router selection by the router 30 in response to detecting an expiration a tree hop timer 84.

FIG. 7A illustrates execution of a preference based attachment router selection. The method begins in step 71, where in response to receiving a router advertisement message from a router advertisement originator, the selection resource 46 selectively removes the old corresponding entry from the Default Router List 55 if present, in order to substitute the new entry. The priority determination resource 42 checks in step 72 whether the new router advertisement originator is a fixed router; if the router advertisement originator is a fixed router, the priority determination resource 42 assigns an assumed default preference value of zero (0).

If in step 72 the new router advertisement originator is not a fixed router, and if in step 75 the new router advertisement originator does not have a higher preference than the mobile router 30 performing the selection, the priority determination resource 42 of the mobile router 30 performing the selection decides in step 76 to not insert the entry.

If the new router advertisement originator is fixed or has a higher preference than the existing router, the priority determination resource 42 looks up in step 74 the first element 80 in the default router list 55, representing the router having the highest priority as determined by the priority determination resource. If in step 77 the priority determination resource 42 has reached the end of the list, the priority determination resource 42 inserts in step 78 the new entry for the new router advertisement originator at the end of the default routing list 55.

If in step 77 the end of the list has not been reached, the priority determination resource 42 begins to determine whether the new entry for the new router advertisement originator should be inserted before the existing element 80 having been accessed from the default router list 55. For example, if in step 90 the new entry has a higher aggregated priority than the existing element 80, the new entry for the new router advertisement originator is inserted before the existing element 80 in step 91; if the new entry has a lower aggregated priority than the existing element 80, the priority determination resource 42 accesses in step 92 the next element 80 in the default router list 55 for comparison with the new entry.

If in step 90 the new entry has the same aggregated priority as the accessed element 80, the priority determination resource 42 determines in step 93 whether the new entry has a higher preference, a lower preference, or the same preference relative to the accessed element 80: if the preference value for the new entry is higher, the new entry is inserted before the accessed element 80 in step 91; if the preference is lower, the next element 80 is accessed in step 92.

If in step 93 the new entry has the same preference as the accessed element 80, the priority determination resource 42 determines in step 94 whether the new entry has a lower tree depth relative to the accessed element 80: if the tree depth for the new entry is lower, the new entry is inserted before the accessed element 80 in step 91; if the tree depth for the new entry is higher, the next element 80 is accessed in step 92.

If in step 94 the tree depth is the same, the priority determination resource 42 determines in step 95 whether the accessed element 80 is the current attachment router: if the accessed element 80 is the current attachment router, the next element 80 is accessed in step 92, in order to give preference to maintaining the existing attachment router.

If in step 95 the accessed element 80 is not the current attachment router, the priority determination resource 42 determines in step 96 if the accessed element 80 has a larger IP address than the new entry: if the accessed element 80 does not have a larger IP address than the new entry, the new entry is inserted in step 91 before the accessed element 80, else in the priority determination resource 42 looks up the next element 80 in step 92.

Figure 7B:
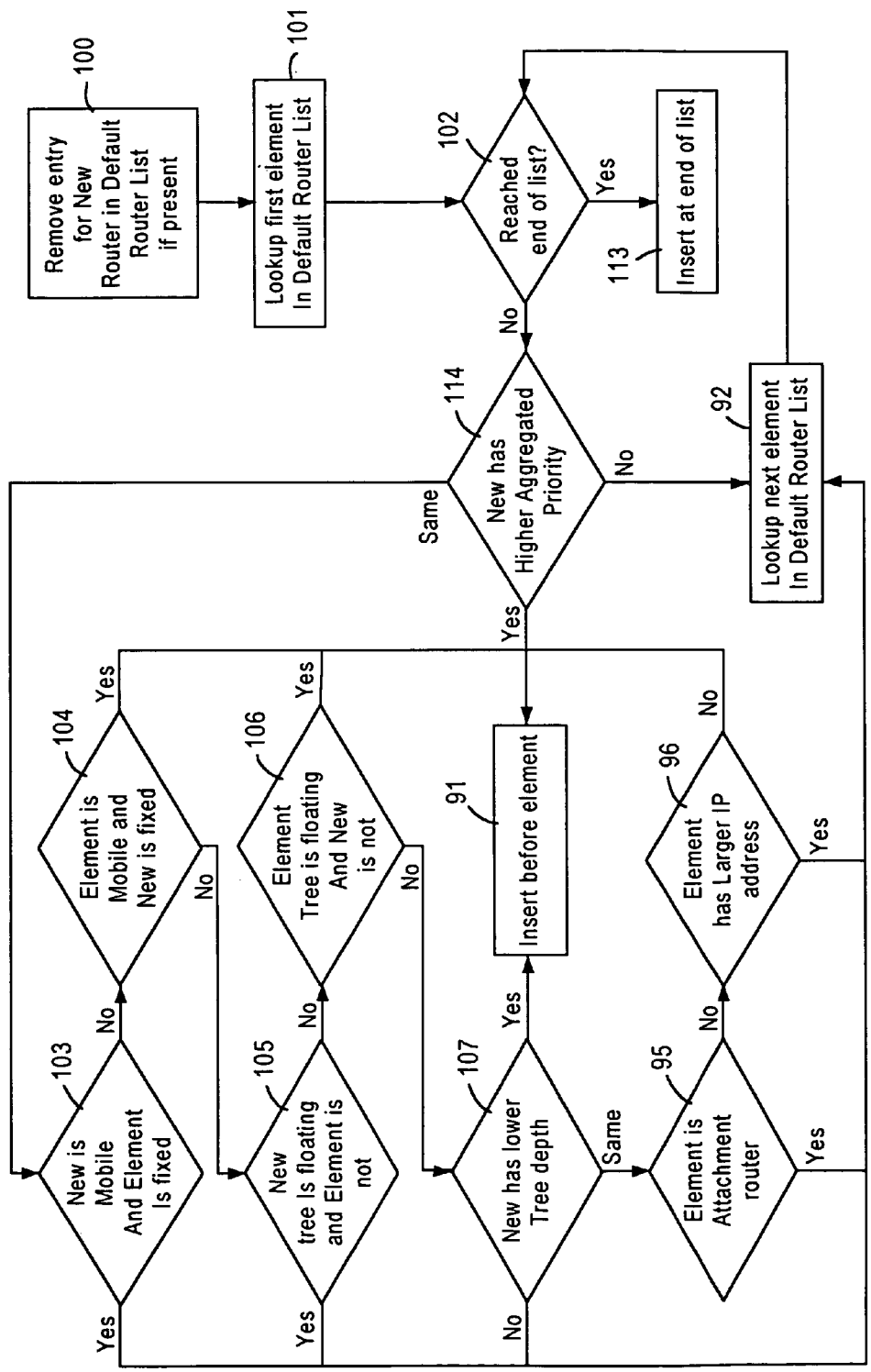

FIG. 7B illustrates a connection-based selection. In particular, in response to a router advertisement message, the priority determination resource 42 removes in step 100 the entry for that router in the default routing table if present.

The priority determination resource 42 looks up in step 101 the first element 80 in the default router list 55, and determines in step 102 if the end of the list has been reached. If the end of the list has been reached, the priority determination resource 42 inserts the entry in step 113 at the end of the list.

Assuming in step 102 the end of the list has not been reached, the priority determination resource 42 determines in step 114 whether the new entry has a higher aggregated priority than the accessed element 80: if the new entry has a higher aggregated priority, the new entry is inserted before the accessed element in step 91; if the new entry has a lesser aggregated priority, the priority determination resource 42 looks up the next element in the default router list 55 in step 92.

If in step 114 the new entry has the same aggregated priority, the priority determination resource 42 determines the relative priority between the new entry and the accessed element 80 based on: whether the new entry is mobile and the accessed element is fixed (step 103), or vice versa (step 104); whether the new entry specifies a floating tree relative to the accessed element (steps 105, 106), and whether the new tree has a lower tree depth (step 107). Based on the relative priorities as illustrated in FIG. 7B, the priority determination resource 42 either inserts the new entry before the accessed element 80 in step 91, or maintains the priority of the accessed element 80 and accesses another element 80 in step 92 to compare the next element to the new entry.

Figure 7C:
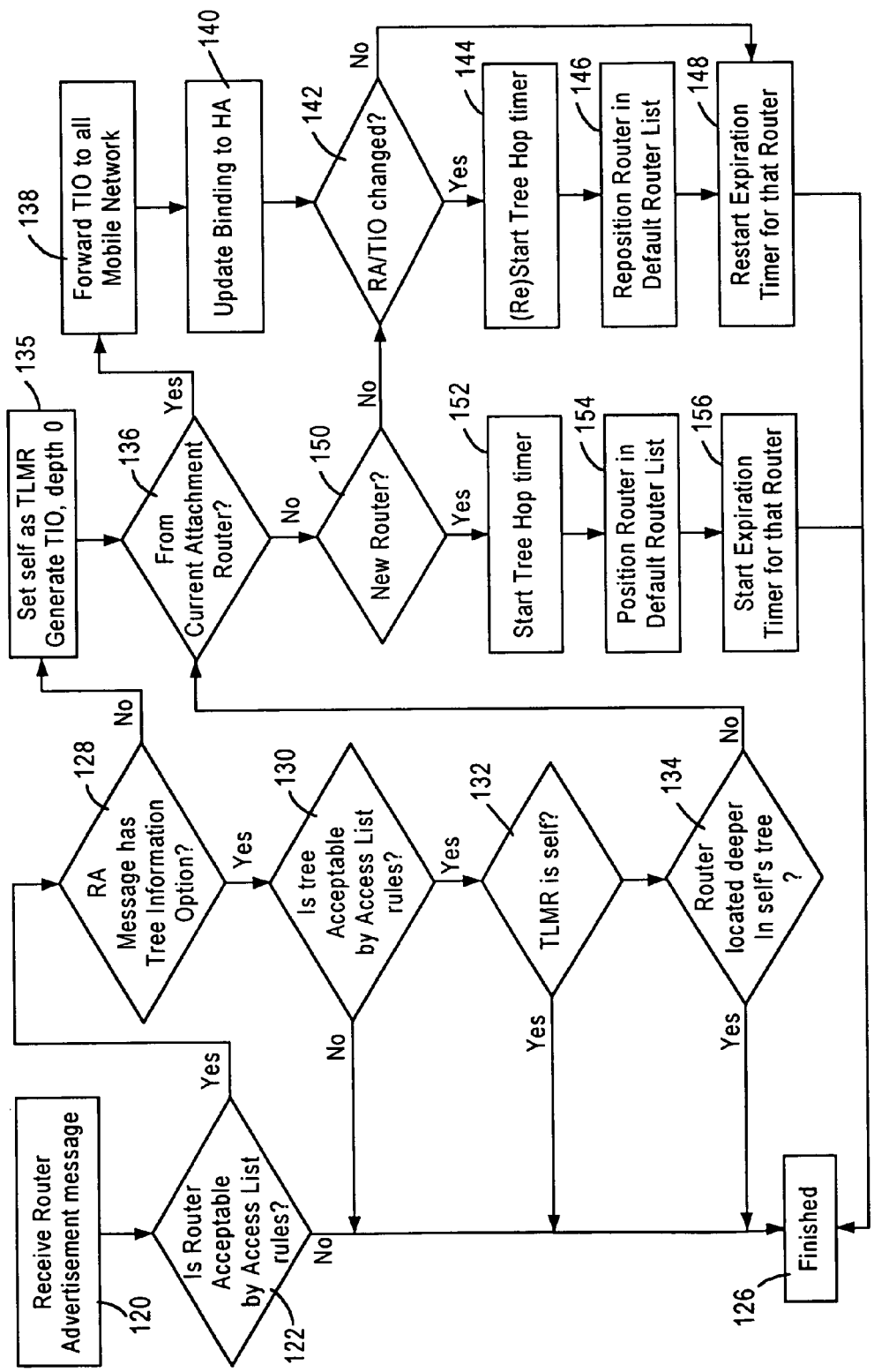
Figure 7D:
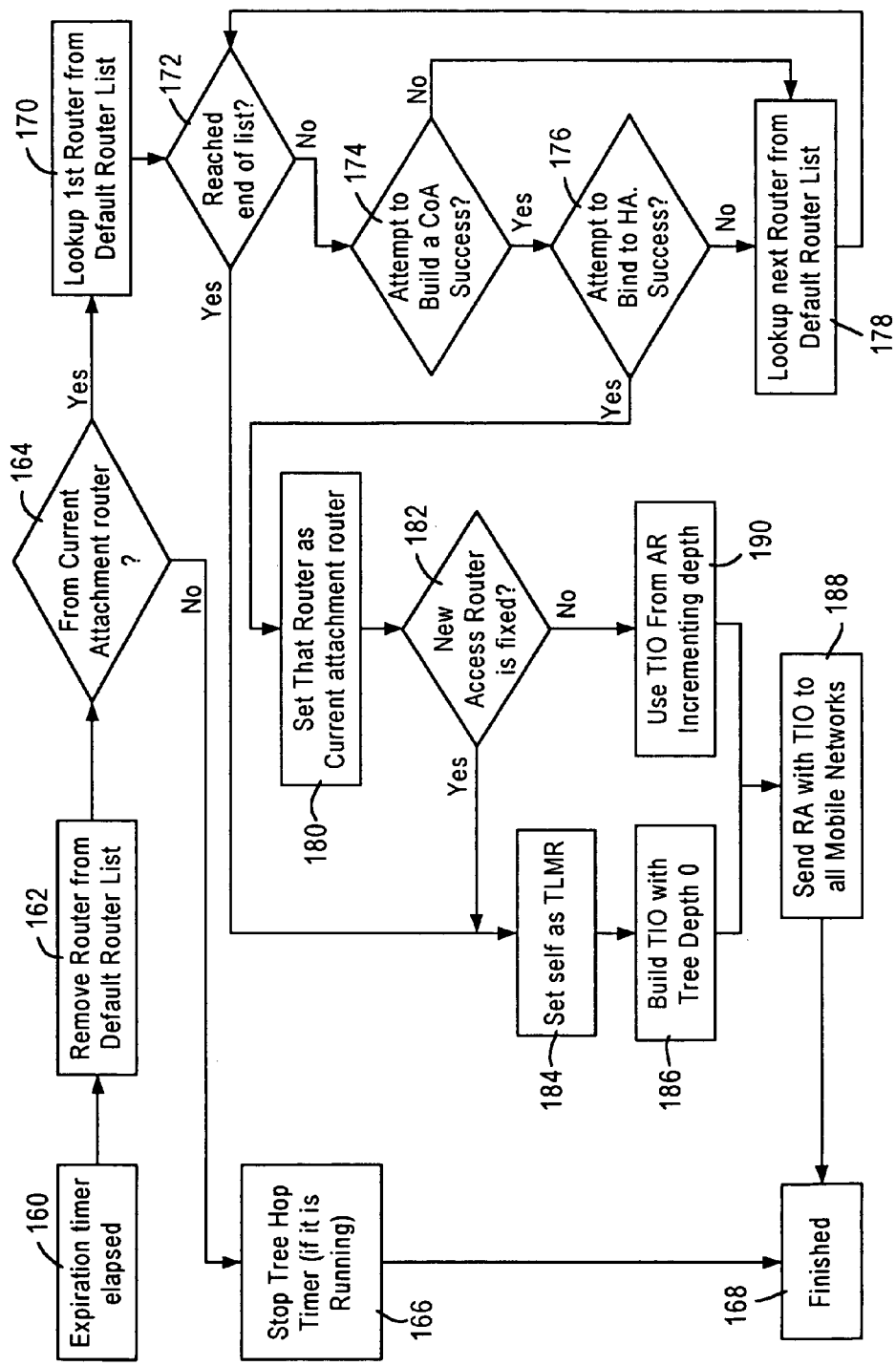
Figure 7E:
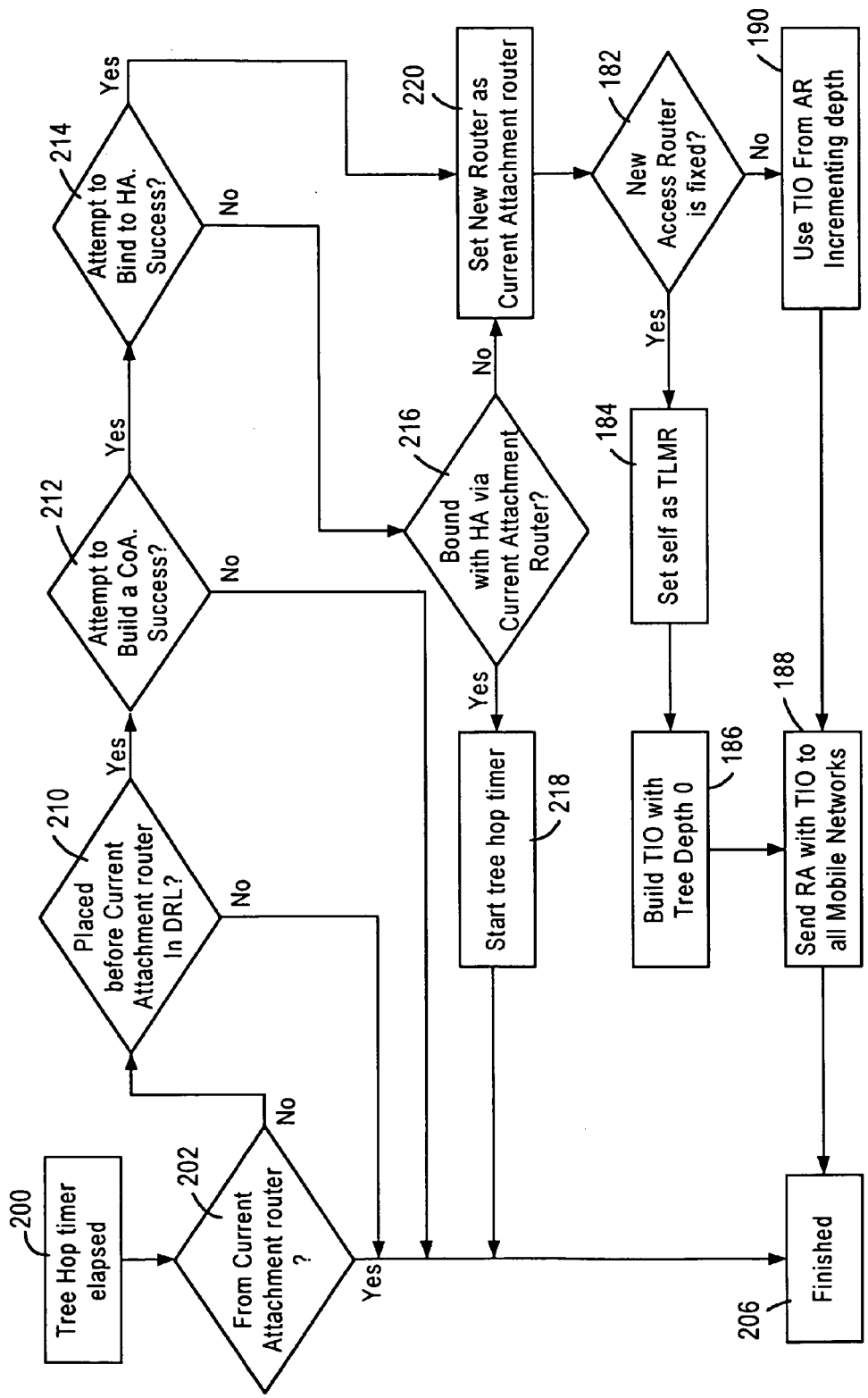

Referring to FIG. 7C, in response to receiving a router advertisement message in step 120 from another router (i.e., the "router advertisement originator"), the selection resource 46 determines in step 122 whether the router advertisement originator is deemed acceptable by a prescribed access list rules, as described above with respect to highest interface and group aggregated priority, and any preference settings as illustrated by the registers 44. If the router advertisement originator is deemed not acceptable, the processing is finished in step 126.

If in step 122 the router advertisement originator is acceptable by access list rules, the selection resource determines in step 128 whether the router advertisement message 34 includes a tree information option 66. If the RA message does not have a tree information option 66, the selection resource 46 selects itself in step 135 as the TLMR, causing the RA generator 48a to generate an RA message having a tree information option (TIO) with a depth value of zero.

Assuming in step 128 the router advertisement message 34 includes a tree information option 66, the selection resource 46 determines in step 130 whether the tree specified in the tree information option 66 is acceptable by access list rules specified for mobile routers. If in step 130 the tree is not acceptable, processing is finished in step 126. If the tree is acceptable, the selection resource 46 determines in step 132 whether the tree information option specifies that the top-level mobile router is itself, for example of the case of a top level mobile router receiving a router advertisement message from the router advertisement originator which is within the same tree. If the mobile router determines that the top level mobile router is itself, the selection resource 46 processing is finished in step 126 to prevent loops.

If in step 132 the selection resource 46 of the mobile router 30 determines that the top level mobile router is another router, the selection resource 46 determines in step 134 from the depth field 68d whether the router advertisement originator is deeper within the same tree to which the mobile router belongs to; if the router advertisement originator is located deeper within the same tree to which the mobile router belongs to, processing is finished in step 126 to prevent loops.

If in step 134 the router advertisement originator is determined to be located higher within the same tree (or in a different tree), the selection resource 46 determines in step 136 whether the router advertisement originator having sent the routing advertisement message 34 is the current attachment router specified in the attachment router register 50. Assuming the router advertisement message 34 is from the current attachment router, the router advertisement generation resource 48a forwards in step 138 the tree information option to all mobile networks, after incrementing the depth field 68d. The bind update resource 48c sends a bind update message in step 140 to the home agent 35. Also note that if the priority determination resource 42 determines in step 142 that the router advertisement or tree information option information has changed, the priority determination resource 42 restarts the corresponding tree hop timer 84 in step 144, repositions in step 146 the router entry 80 within the default router list 55, and restarts the expiration timer 82 for that router in step 148. Note in step 142 that if no routing information has changed, the expiration timer 82 for that router is restarted in step 148, and processing is finished in step 126.

If in step 136 the router advertisement message 34 is not from the current attachment router, the selection resource 46 determines in step 150 whether the message 34 is from a new router not specified within the default router list 55: if the RA message 34 is from a router already specified in the default router list 55, the priority determination resource 42 checks in step 142 whether any router advertisement or tree information option information has changed relative to the attributes stored in the corresponding entry 80, and selectively updates the default router list 55 as described above with respect to steps 142, 144, 146, and 148.

If in step 150 the message 34 is from a new router, the priority determination resource 42 creates a new entry 80 in the default router list 55 and starts in step 152 the corresponding tree hop timer 84. The priority determination resource 42 positions in step 154 the router entry 80 within the default router list 55, and starts in step 156 the expiration timer 82 for the new router.

FIG. 7C illustrates the selection process based on expiration of a router expiration timer 82. Assuming in step 160 that an expiration timer 82 has elapsed the selection resource 46 removes the router entry 80 from the default router list 55 in step 162. If in step 164 the selection resource determines that the router entry 80 is not the current attachment router specified in the attachment router register 50, the selection resource 46 stops the corresponding tree hop timer 84 in step 166, finishing the processing in step 168. However if in step 164 the expiration timer 82 has elapsed for the current attachment router, the selection resource 46 performs a lookup in step 170 for the first router in the default router list 55 having the highest selection criteria (i.e., the highest priority relative to the other routers specified in the default router list 55). Assuming in step 172 there is a valid entry 80 such that the selection resource 46 has not reached the end of the list, the selection resource 46 attempts in step 174 to build a new care of address based on the router entry 80 at the top of the list. Assuming in step 174 that the selection resource 46 is able to build a valid care of address, the bind update resource 48c attempts in step 176 to bind with the home agent 35 by sending a bind update message: if binding attempts are unsuccessful, the selection resource 46 performs a lookup of the next router entry 80 from the default router list 55 in step 178.

If in step 176 the bind update resource 48c is able to successfully bind with the home agent 35 for notification of the updated care of address, the selection resource 46 sets the selected router as the current attachment router 180 by inserting a pointer to the corresponding router entry 80 in the attachment router register 50.

If in step 182 the priority determination resource 42 determines that the new attachment router is a fixed router, the priority determination resource 42 sets itself in step 184 as a top level mobile router, and the router advertisement generation resource 48 builds in step 186 a router advertisement message 34 having a tree information option 66 specifying the tree depth 68d to have a value of zero. The network interface 40 outputs in step 188 the router advertisement message 34 with the tree information option 66 to all mobile networks, completing processing in step 168.

If in step 182 the new attachment router is not a fixed router, the router advertisement generation resource 48 uses the tree information option 66 from the received attachment router and increments the depth field 68f in step 190 prior to outputting the router advertisement message 34 in step 188.

Note that if in step 172 there is no available router entry 80, the priority determination resource 42 will sets itself as its own top level mobile router in step 184 as a floating tree, and send a router advertisement message as specified with respect to steps 186 and 188.

FIG. 7E illustrates the processing in response to expiration of a tree hop timer 84 in step 200. The selection resource 46 determines in step 202 whether the tree hop timer 84 elapsed for the current attachment router. If the tree hop timer 84 elapsed for the current attachment router, the processing is finished in step 206.

If in step 202 the tree hop timer elapsed for another router, the selection resource 46 determines in step 210 if the entry is above the current attachment router in the default router list 55: if the entry 80 is not above the entry for the current attachment router, the message is dropped and processing is finished in step 206. However if the entry is above the current attachment router in the default router list 55, the selection resource 46 attempts to switch to the new attachment router by attempting in step 212 to build a care of address and perform a bind update registration with the home agent 35 in step 214, as described above with respect to steps 174 and 176 of FIG. 7C, respectively.

If in step 214 the bind attempt is unsuccessful, the selection resource 46 determines in step 216 whether the mobile router 30 can bind with the home agent 35 via the current attachment router. If the mobile router can bind with the home agent 35 via the current attachment router, the selection resource 46 starts the tree hop timer for the current attachment router in step 218, and completes processing in step 206. However if the mobile router cannot bind with the home agent 35 via the current attachment router, the selection resource 46 sets in step 220 the new router identified in step 210 as the current attachment router, as described above with respect to steps 180. The selection resource 46 and complete the processing for the new attachment router as described above with respect to steps 182, 184, 186, 188, and 190.

According to the disclosed embodiment, mobile routers can be configured to automatically select which router to attach to within a mobile network, in a manner that enables selection according to prescribed network and topology based preferences. Hence, mobile routers can be configured to automatically form network topology models optimized for different selected priorities, including Internet based connectivity, or preserving tree structures within a mobile network, as desired.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router configured for establishing communications within a mobile network having at least two routers, the method comprising:

detecting a router advertisement message that includes a source address identifying the corresponding router having sent the router advertisement message, and a tree information option field having attributes specifying a network topology model of the corresponding router;

determining a priority of the network topology model relative to identified priorities; and selectively attaching to the router having sent the router advertisement message based on the determined priority of the corresponding network topology model.

2. The method of claim 1, wherein the selectively attaching step includes storing the source address of the router in an attachment router register configured for specifying a network node having reachability to a wide area network.

3. The method of claim 2, further comprising outputting a new router advertisement message that includes the source address identifying the mobile router, and attributes within the tree information option field specifying the network topology model established by the mobile router relative to the router specified in the attachment router register.

4. The method of claim 3, wherein the outputting step includes generating, within a tree depth field in the tree information option field, an incremented value relative to the tree depth field specified in the router advertisement message.

5. The method of claim 4, further comprising outputting an update message to a prescribed home agent for the mobile router, the update message specifying an updated care of address for use in reaching the router via the router specified in the attachment router register.

6. The method of claim 1, wherein the determining step includes identifying, as attributes specified within the tree information option, an identifier that uniquely identifies a top level mobile router for the corresponding network topology model, a preference value that specifies a corresponding priority for the top level mobile router according to a prescribed hierarchy, a depth value that specifies a depth of the router having sent the router advertisement message within the network topology model, and a fixed/mobile indicator indicating whether the top level mobile router is one of a fixed router and a mobile router.

7. The method of claim 6, wherein the determining step further includes ordering a router list having multiple entries specifying attributes for respective routers, the ordering based on the respective attributes of the routers relative to the identified priorities.

8. The method of claim 7, wherein the ordering step includes reordering the list in response to detection of one of a received router advertisement message, and the selectively attaching step includes selecting an identified router from the router list based on a corresponding position within the router list relative to an existing router entry having been selected as a current attachment router, in response to one of expiration of a router expiration timer for the current attachment router, and expiration of a corresponding tree hop timer for the identified router.

9. The method of claim 7, wherein the tree information option field includes a tree group identifier for a corresponding tree group within the network topology model, the selectively attaching step including selecting the router having sent the router advertisement based on:
identifying a tree group, based on its corresponding tree group identifier, having a highest aggregated priority; and
identifying a router within the tree group having a highest corresponding preference value and the highest aggregated priority.

10. The method of claim 7, wherein the tree information option field includes a tree group identifier for a corresponding tree group within the network topology model, the selectively attaching step including selecting the router having sent the router advertisement based on:
identifying a tree group, based on its corresponding tree group identifier, has a determined highest aggregated priority;
determining whether the identified tree group has a detected fixed router within the network topology model;
if no fixed router is detected, identifying a grounded tree having a determined highest aggregated priority and a minimal tree depth.

11. The method of claim 1, further comprising repeating the determining step and the selectively attaching step for a second router having sent a corresponding second router advertisement message, based on at least one of reception of the second router advertisement message.

12. A mobile router configured for establishing communications within a mobile network having at least two routers, the router comprising:
means for detecting a router advertisement message that includes a source address identifying the corresponding router having sent the router advertisement message, and a tree information option field having attributes specifying a network topology model of the corresponding router;
means for determining a priority of the network topology model relative to identified priorities; and
means for selectively attaching to the router having sent the router advertisement message based on the determined priority of the corresponding network topology model.

13. The mobile router of claim 12, wherein the selectively attaching means is configured for storing the source address of the router in an attachment router register configured for specifying a network node having reachability to a wide area network.

14. The mobile router of claim 13, further comprising means for outputting a new router advertisement message that includes the source address identifying the mobile router, and attributes within the tree information option field specifying the network topology model established by the mobile router relative to the router specified in the attachment router register.

15. The mobile router of claim 14, wherein the outputting means is configured for generating, within a tree depth field in the tree information option field, an incremented value relative to the tree depth field specified in the router advertisement message.

16. The mobile router of claim 15, wherein the outputting means is configured for outputting an update message to a prescribed home agent for the mobile router, the update message specifying an updated care of address for use in reaching the router via the router specified in the attachment router register.

17. The mobile router of claim 13, wherein the determining means is configured for identifying, as attributes specified within the tree information option, an identifier that uniquely identifies a top level mobile router for the corresponding network topology model, a preference value that specifies a corresponding priority for the top level mobile router according to a prescribed hierarchy, a depth value that specifies a depth of the router having sent the router advertisement message within the network topology model, and a fixed/mobile indicator indicating whether the top level mobile router is one of a fixed router and a mobile router.

18. The mobile router of claim 17, wherein the determining means is configured for ordering a router list having multiple entries specifying attributes for respective routers, the ordering based on the respective attributes of the routers relative to the identified priorities.

19. The mobile router of claim 18, wherein the ordering includes reordering the list in response to detection of one of a received router advertisement message, and the selectively attaching means configured for selecting an identified router from the router list based on a corresponding position within the router list relative to an existing router entry having been selected as a current attachment router, in response to one of expiration of a router expiration timer for the current attachment router, and expiration of a corresponding tree hop timer for the identified router.

20. The mobile router of claim 18, wherein the tree information option field includes a tree group identifier for a corresponding tree group within the network topology model, the selectively attaching means configured for selecting the router having sent the router advertisement based on:
identifying a tree group, based on its corresponding tree group identifier, having a highest aggregated priority; and
identifying a router within the tree group having a highest corresponding preference value and the highest aggregated priority.

21. The mobile router of claim 18, wherein the tree information option field includes a tree group identifier for a corresponding tree group within the network topology model, the selectively attaching means configured for selecting the router having sent the router advertisement based on:
identifying a tree group, based on its corresponding tree group identifier, has a determined highest aggregated priority;
determining whether the identified tree group has a detected fixed router within the network topology model;
if no fixed router is detected, identifying a grounded tree having a determined highest aggregated priority and a minimal tree depth.

22. The mobile router of claim 12, wherein the determining and selectively attaching means are configured for repeating the determining the selectively attaching, respectively, for a second router having sent a corresponding second router advertisement message, based on at least one of reception of the second router advertisement message.

23. A mobile router configured for establishing communications within a mobile network having at least two routers, the router comprising:

a network interface configured for detecting a router advertisement message that includes a source address identifying the corresponding router having sent the router advertisement message, and a tree information option field having attributes specifying a network topology model of the corresponding router;

a first resource configured for determining a priority of the network topology model relative to identified priorities; and a second resource configured for selectively attaching to the router having sent the router advertisement message based on the determined priority of the corresponding network topology model.

24. The mobile router of claim 23, wherein the second resource is configured for storing the source address of the router in an attachment router register configured for specifying a network node having reachability to a wide area network.

25. The mobile router of claim 24, further comprising a third resource configured for outputting a new router advertisement message that includes the source address identifying the mobile router, and attributes within the tree information option field specifying the network topology model established by the mobile router relative to the router specified in the attachment router register.

26. The mobile router of claim 25, wherein the third resource is configured for generating, within a tree depth field in the tree information option field, an incremented value relative to the tree depth field specified in the router advertisement message.

27. The mobile router of claim 26, wherein the third resource is configured for outputting an update message to a prescribed home agent for the mobile router, the update message specifying an updated care of address for use in reaching the router via the router specified in the attachment router register.

28. The mobile router of claim 23, wherein the first resource is configured for identifying, as attributes specified within the tree information option, an identifier that uniquely identifies a top level mobile router for the corresponding network topology model, a preference value that specifics a corresponding priority for the top level mobile router according to a prescribed hierarchy, a depth value that specifies a depth of the router having sent the router advertisement message within the network topology model, and a fixed/mobile indicator indicating whether the top level mobile router is one of a fixed router and a mobile router.

29. The mobile router of claim 28, wherein the first resource is configured for ordering a router list having multiple entries specifying attributes for respective routers, the ordering based on the respective attributes of the routers relative to the identified priorities.

30. The mobile router of claim 29, wherein the ordering includes reordering the list in response to detection of one of a received router advertisement message, and the second resource configured for selecting an identified router from the router list based on a corresponding position within the router list relative to an existing router entry having been selected as a current attachment router, in response to one of expiration of a router expiration timer for the current attachment router, and expiration of a corresponding tree hop timer for the identified router.

31. The mobile router of claim 29, wherein the tree information option field includes a tree group identifier for a corresponding tree group within the network topology model, the second resource configured for selecting the router having sent the router advertisement based on:

identifying a tree group, based on its corresponding tree group identifier, having a highest aggregated priority; and identifying a router within the tree group having a highest corresponding preference value and the highest aggregated priority.

32. The mobile router of claim 29, wherein the tree information option field includes a tree group identifier for a corresponding tree group within the network topology model, the second resource con figured for selecting the router having sent the router advertisement based on:

identifying a tree group, based on its corresponding tree group identifies has a determined highest aggregated priority;

determining whether the identified tree group has a detected fixed router within the network topology model;

if no fixed router is detected, identifying a grounded tree having a determined highest aggregated priority and a minimal tree depth.

33. The mobile router of claim 23, wherein in response to reception of a second router advertisement message from a second router having sent a corresponding second router advertisement message, the first resource is configured for repeating the determining of the priority based on the second router advertisement message, and the second resource is configured for repeating the selectively attaching based on the router advertisement message and the second router advertisement message.

* * * * *